Dec. 10, 1940.  B. C. THOMSON ET AL  2,224,662
CANE CUTTING AND WINDROWING MACHINE
Filed Jan. 24, 1939  4 Sheets-Sheet 1

Inventors
BYRON CLAUDE THOMSON,
JOSEPH JONES MUNSON,

By Smith, Michael & Gardiner,
Attorneys.

Dec. 10, 1940.    B. C. THOMSON ET AL    2,224,662
CANE CUTTING AND WINDROWING MACHINE
Filed Jan. 24, 1939    4 Sheets-Sheet 2

Inventors
BYRON CLAUDE THOMSON,
JOSEPH JONES MUNSON,
Attorneys

Dec. 10, 1940.   B. C. THOMSON ET AL   2,224,662
CANE CUTTING AND WINDROWING MACHINE
Filed Jan. 24, 1939   4 Sheets-Sheet 4

Inventors
BYRON CLAUDE THOMSON,
JOSEPH JONES MUNSON,

By Smith, Michael & Gardiner,
Attorneys

Patented Dec. 10, 1940

2,224,662

UNITED STATES PATENT OFFICE 2,224,662

CANE CUTTING AND WINDROWING MACHINE

Byron Claude Thomson, Assumption Parish, and Joseph Jones Munson, Terrebonne Parish, La.

Application January 24, 1939, Serial No. 252,660

11 Claims. (Cl. 56—15)

The present invention relates to a machine for cutting cane and while it may be used merely for cutting of the cane for the mill, it relates more particularly to that type of machine which cuts and windrows the cane as a preliminary operation in the harvest of the crop for the purpose of protecting the cane against freezes.

Cane is planted in rows approximately six feet apart and at the end of the cultivating season the rows are approximately one foot higher than the "middle" or furrow between the rows, sometimes higher.

In harvesting the cane several important features should be kept in mind. The cane should be cut as close to the ground as possible, partly because the richest juices are at the bottom of the stalk and partly because the root is left in the ground to come up a second year as stubble cane and if left exposed to the weather tends to sour and hurt the stubble crop.

Cane is now universally cut by hand, the laborers going along and first slicing off the top of the stalk with a knife, stripping down the leaves with a stroke from the knife and then with the stalk pulled to the workman, the cane is slashed through at the ground and piled behind the worker.

Cane is grown in this country in regions having variable weather conditions and from time to time cold of sufficient intensity to kill both the foliage of the cane and the butt is encountered. Under such conditions the cane tends to turn acid from the top downward, the plant circulation ceases and the deterioration of the cane is rather rapid. Those skilled in the art know that it is desirable to windrow sugar cane as the initial step in the harvesting for the purpose of protecting against such freezes, and that it is essential that the windrowing be done in a very specific manner in order to insure protection.

The proper windrowing of sugar cane requires that it be carefully placed in the "middle" or furrow between two rows in such a manner that the tops of the cane properly lap over and protect the lower portion or butt end of the preceding stalk, thus resulting in matting the cane between the rows in a somewhat shingle effect. By such arrangement the extreme lower ends or butts come into contact with the earth as far as possible so that the temperature of the ground and the fact that the butts are in the lowest level in the furrow causes the cane to remain cold in the windrows, thus retarding deterioration.

The present invention relates to a machine for properly cutting and windrowing cane while at the same time preserving the principle of cutting that is now employed by hand.

One of the objects of the present invention is to provide a power driven device which straddles two rows of cane and is of sufficient height to pass over the top of the cane so that as the cane is cut it falls rearwardly, after which it is moved from either side toward the longitudinal center of the machine and dropped in the "middle" or furrow in overlapping relation, as heretofore mentioned.

A further object of the invention is to provide a device in which the height of the cutting element is adjustable so that the cane can be cut as closely to the ground as possible regardless of variations in the height of the rows.

A further important object of the present invention is to provide conveying means which operate upon the cane in such manner that the cane is bent rearwardly with reference to the direction of movement of the machine so that at the time it is cut it is bent and to this extent the cutting operation follows similar practice as now employed in cutting cane by hand.

An additional object is to provide a machine having devices thereon which assist in feeding the cane inwardly toward the center of the machine and downwardly toward the rear end of the machine to thereby insure proper windrowing of the same.

Other objects and advantages will be readily apparent to those skilled in the art as the result of the following description taken in conjunction with the accompanying drawings, in which:

Fig. 5 is a detail view relating to the adjusting means for the cutter member.

Figure 1:
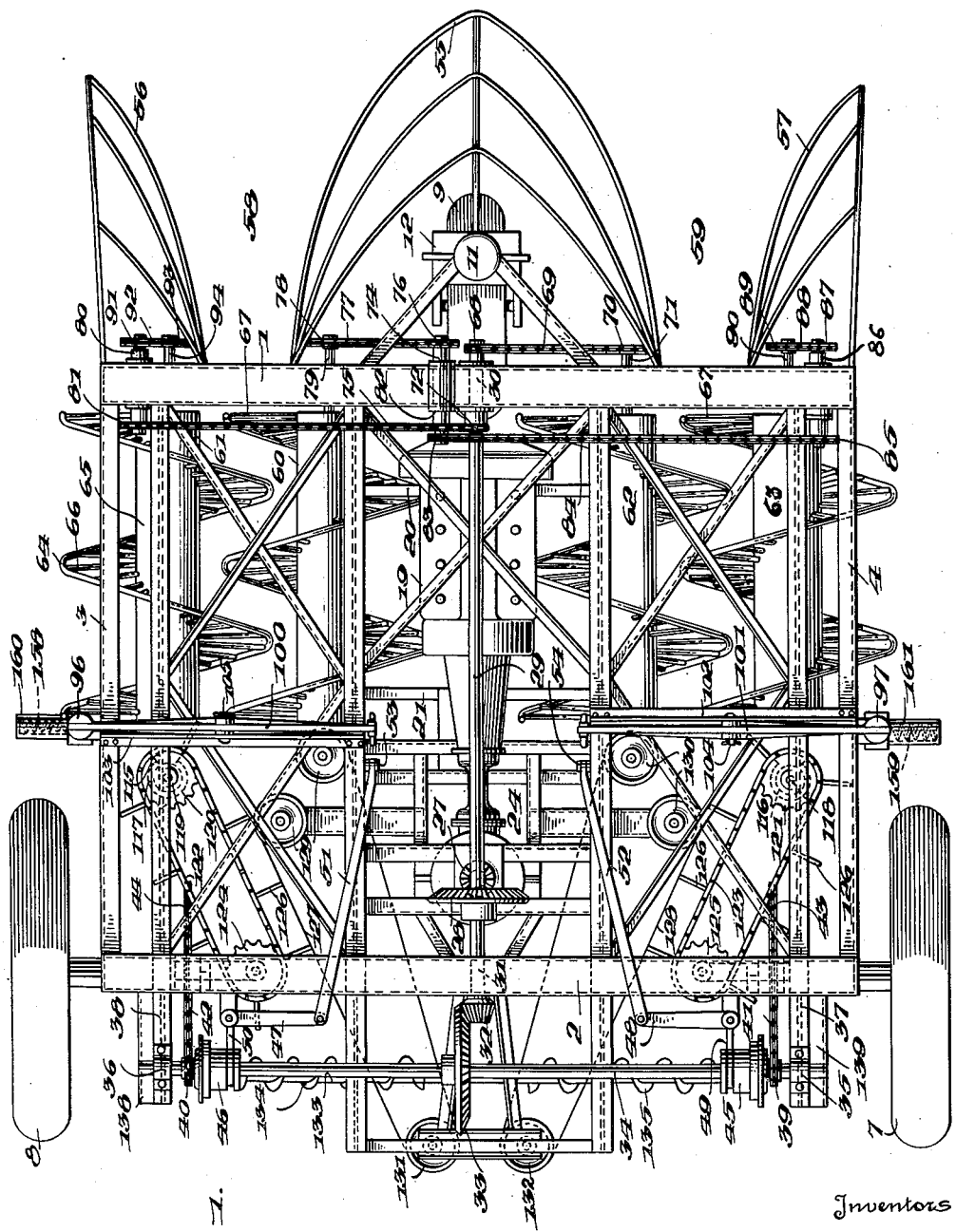
Figure 1 is a plan view of our invention.

The machine consists of a frame composed of a front member 1 and a rear member 2 which are connected by means of side elements 3 and 4, thereby forming a frame which in plan is substantially rectangular.

The front and rear frame members 1 and 2 are of substantially inverted U-shape and while each of the members is shown as being made of a construction braced by means of the cross struts 5, it is to be understood that these end members may be of any suitable construction and made of any desired materials.

Figure 2:
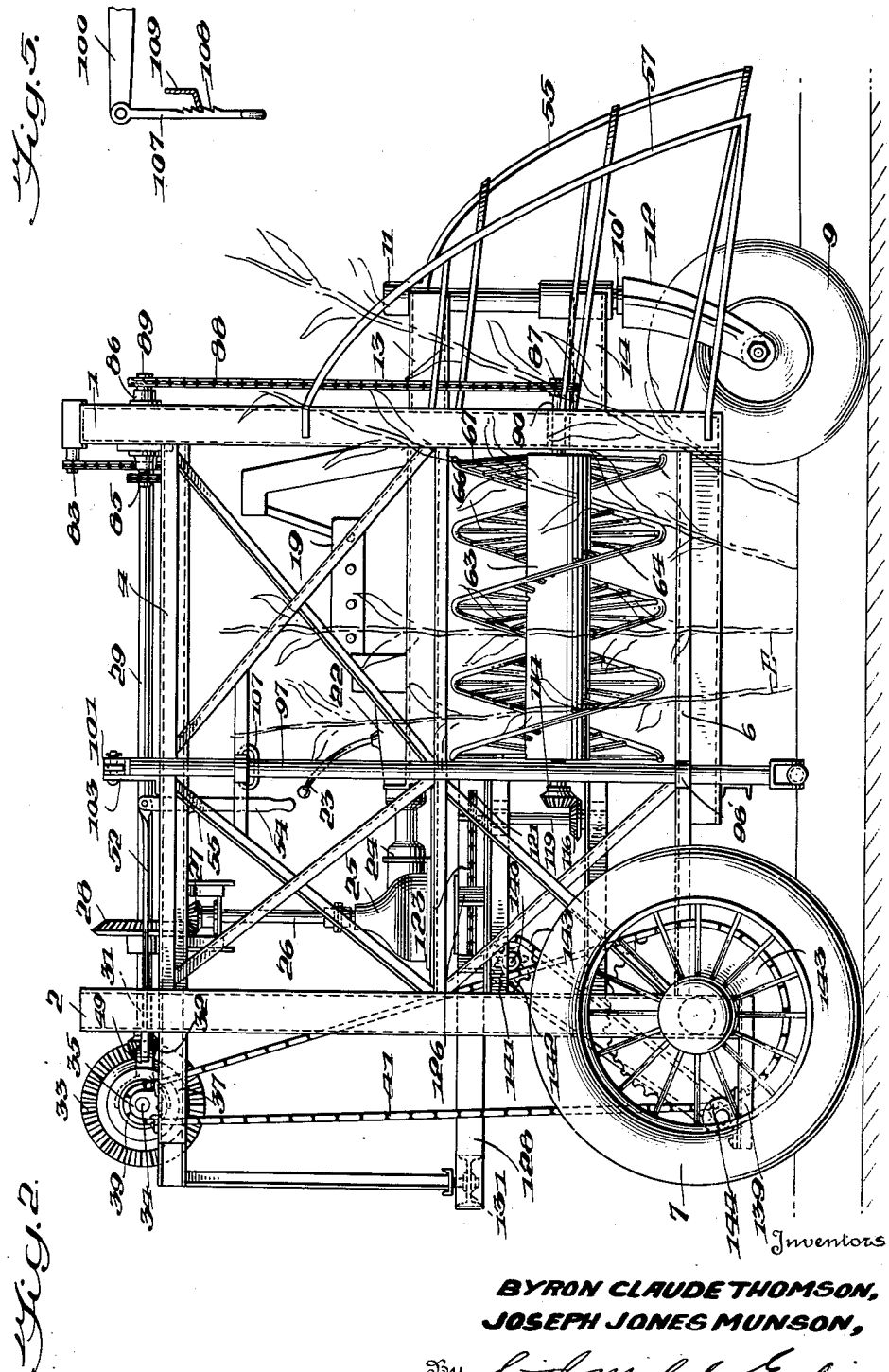
Fig. 2 is a side elevation thereof.

The lower ends of the end members are joined by means of frame members such as indicated at 6, it being understood that a similar member is employed on the opposite side of the machine as viewed in Fig. 2.

It is to be understood that the particular shape of the frame is not of great importance so long as it is of sufficient height to permit the cane to pass beneath the same and of sufficient width to permit straddling of two rows, but in this description certain additional features of the frame will be brought out due to the fact that all of the operating parts are mounted thereon.

The frame is carried for movement along the rows of cane by rear wheels 7 and 8 and a front wheel 9. The rear wheels are mounted on spindles 10 journaled in suitable bearings which are supported by the frame and the front wheel 9, which is of the caster type, is provided with a spindle 10' journaled in suitable bearings carried by the housing 11, it being understood that the spindle 10' carries the usual fork 12 straddling the front wheel and that the spindle 10' is freely rotatable within the housing 11.

As shown, the housing 11 is attached to the frame by means of upper braces 13 and lower braces 14 which are in turn attached to supporting frames 15 and 16 depending from the end 1.

Figure 4:
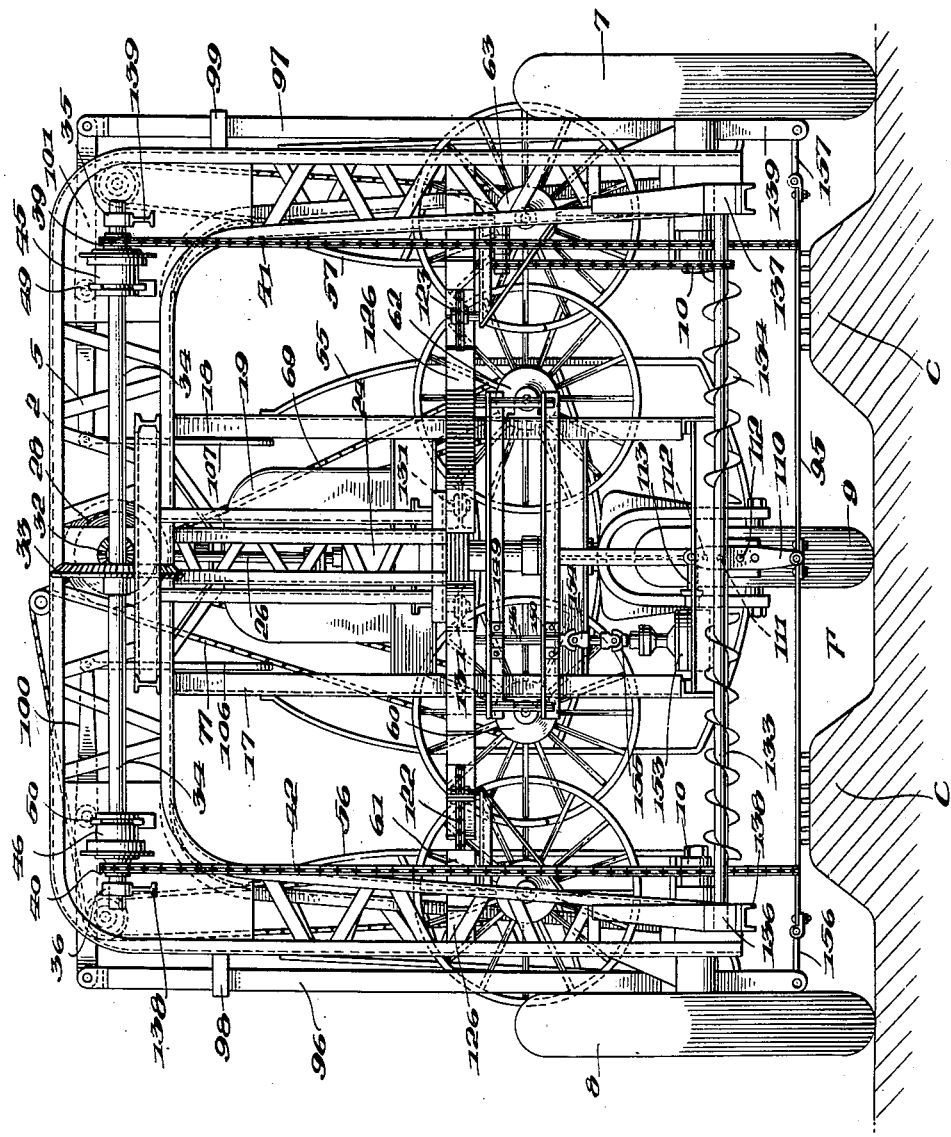
Fig. 4 is a rear elevation.

At the rear of the machine as shown in Fig. 4, it will be seen that similar depending frame elements 17 and 18 are provided for purposes which will be described later.

The machine is propelled by means of a motor illustrated at 19 which is carried within the frame by means of supports 20 and 21, it being noted that the motor is mounted centrally of the machine and with its crank shaft extending longitudinally thereof.

The motor 19 drives through suitable transmission 22 provided with the usual gear shift lever 23 to a drive shaft housed within the housing 24, which drive shaft is connected to a ring gear within the housing 25 for transmitting power to the vertical shaft 26 provided at its upper end with a pinion 27 meshing with a gear 28 carried on the power shaft 29 which is rotatably mounted in bearings 30 and 31 in the end frames 1 and 2, respectively.

At the rear end of the power shaft 29 there is provided a beveled pinion 32 meshing with beveled gear 33 carried by the cross shaft 34 which is journaled in bearings 35 and 36 carried on supplemental side frames 37 and 38, respectively.

The cross shaft 34 is provided at its opposite ends with sprocket wheels 39 and 40 over which sprocket chains 41 and 42 are trained.

The spindles 10 for the rear wheels 7 and 8 are provided with sprocket wheels 43 and 44 which are engaged by the sprocket chains 41 and 42, respectively, and by this means rotation is imparted to the rear wheels and the machine driven.

In order that the machine may be properly steered, suitable clutches 45 and 46 are disposed at opposite ends of the cross shaft 34, and it will be understood that by engaging one and disengaging the other power will be transmitted to one or the other of the rear wheels depending upon which clutch is engaged, while the disengaged wheel will idle.

The clutches are controlled by a series of levers consisting of bell cranks 47 and 48 having yokes 49 and 50 engaging the collars of the clutches in a known manner.

The bell cranks 47 and 48 are attached to levers 51 and 52, respectively, which are in turn connected to the hand levers 53 and 54, respectively, one of the hand levers being shown in Fig. 2 as being pivoted as at 55.

From the foregoing it will be seen that by manipulating the hand levers such as indicated at 54, either of the clutches may be disengaged or engaged so that proper steering of the machine can be accomplished.

It will be evident that while the foregoing description deals with a machine that is driven by means of a motor, such operation is not essential since the machine could be propelled by any desired means, but it is to be noted that in the construction described and shown the driving shafts are located at the top of the machine above the cane so that there is little or no danger of the cane becoming entangled in the same to cause stoppage thereof.

At the front end of the machine there are provided guides which, during the forward motion of the machine, straighten the cane to a position where it can be engaged by suitable screw conveyors and carried thereby into engagement with the cutting member.

The guides consist of a central member 55 diverging from opposite sides of its leading edge and which will cause any cane in either row that is leaning toward the center of the machine to be straightened toward vertical position, whereas the side guides 56 and 57 will straighten any cane that is leaning away from the center so that the cane in each row is brought to substantially vertical position in order that it may be engaged by the screw conveyors.

It is to be understood that the guide members 55, 56 and 57 may be constructed in any suitable manner but have here been illustrated as consisting of rods bent to proper shape, rather than more cumbersome and heavy constructions, in order that the weight of the machine may not be unduly augmented.

The guides 55, 56 and 57 in effect form between them gradually converging throats 58 and 59 through which the cane must pass on its way to the cutting member, and in this manner, notwithstanding the fact that cane grows in closely clustering bunches, it will nevertheless be forced into proper position so that it can be properly cut by the cutting member.

Immediately to the rear of the throat 58 there is provided a pair of screw conveyors 60 and 61 with the screws thereof intermeshing. Immediately behind the throat 59 there is likewise provided a pair of conveying screws 62 and 63 with the screws likewise intermeshing.

The screws are disclosed as being constructed of a helical rod as indicated at 64, which are connected to hubs 65 by means of spokes 66.

The leading spoke of conveyor 60 and the leading spoke of conveyor 63 are provided with rollers 67 which facilitate entry of the cane into the screw conveyors.

Suitable means are provided for rotating the two pairs of intermeshing screws so that if the machine travels forwardly or to the right as viewed in Figs. 1 and 2, the cane is first brought to proper position by means of the guides 55, 56 and 57 and is afterwards engaged by the screw conveyors which force any of the cane that may lean in a forwardly direction to be straightened first into a vertical position and subsequently, due to the fact that the screw conveyors are driven at a speed faster than the forward travel of the machine, the cane is gradually bent rearwardly and it is in this position when the cutting member severs it from the root.

The mechanism for driving the screw conveyors will now be described.

Figure 3:
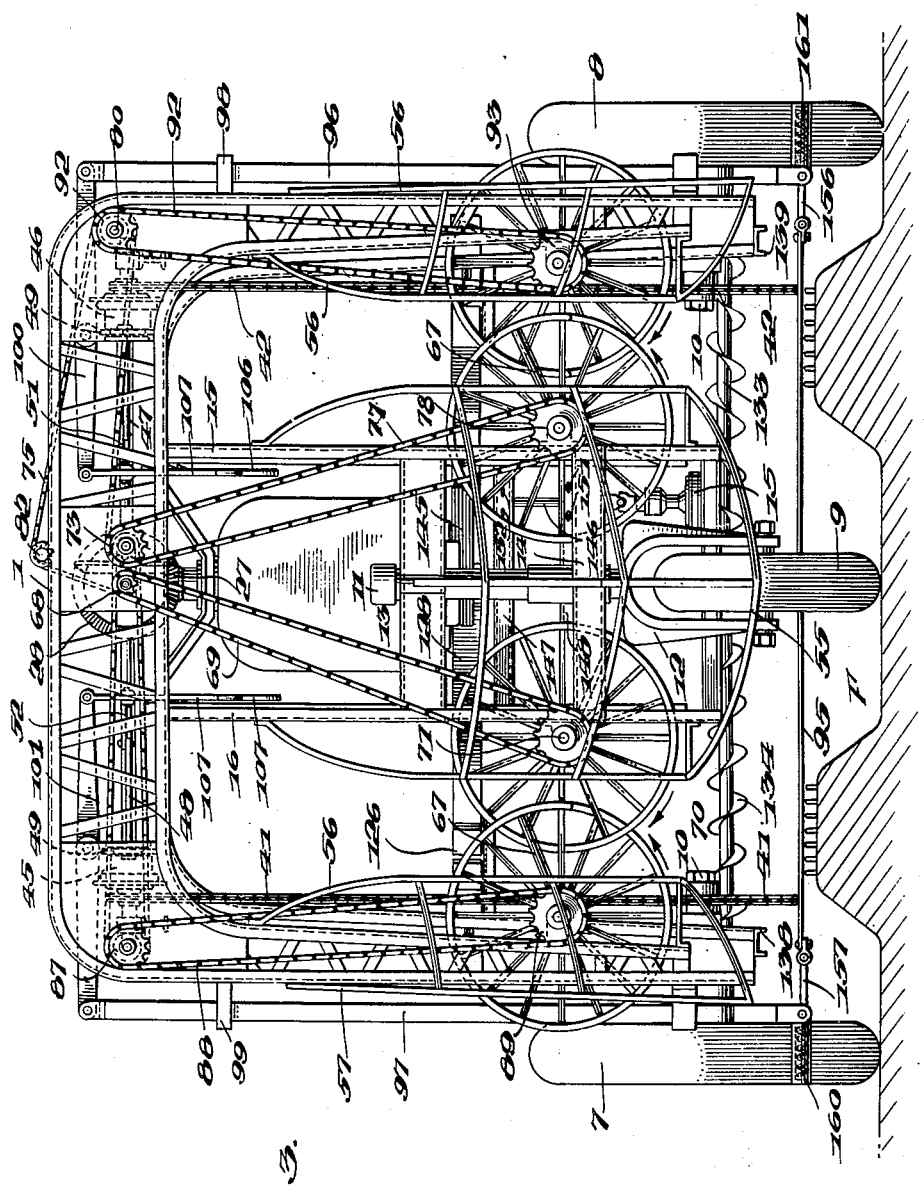
Fig. 3 is a front elevation.

The power shaft 29 carries on its forward extension a sprocket 68 which drives through sprocket chain 69 to a sprocket 70 carried on the shaft 71 suitably journaled to the frame and which shaft 71 carries thereon the screw conveyor 62 which is driven in the direction of the arrows shown in Fig. 3. The power shaft 29 likewise carries a sprocket 72 which drives a sprocket 73 carried on a jack shaft 74 through the bottom run of chain 75. At the forward end of the jack shaft 74 there is provided a sprocket 76 driving through chain 77 the sprocket 78 carried on the shaft 79, which shaft carries the screw conveyor 60.

The sprocket chain 75 also drives the jack shaft 80 through sprocket 81 mounted on the inner end thereof and the top run of chain 42 passes over an adjustable tightening idler 82 and thence back around the sprocket 72.

Carried on the jack shaft 74 is a sprocket 83 which drives through chain 84 to the sprocket 85 carried on jack shaft 86. At its forward end the jack shaft 86 carries a sprocket 87 driving through chain 88 to the sprocket 89 carried by the shaft 90 which also carries the screw conveyor 63.

The jack shaft 80 is likewise provided with a sprocket 91 driving through chain 92 to a sprocket 93 carried by shaft 94 which also carries the screw conveyor 61.

It will be noted that by the arrangement of sprockets and chains that the conveying screws will be driven in the direction as indicated by the arrows as shown in Fig. 3 so that the cane which is engaged by the screws is gradually forced into proper cutting position as hereinbefore described.

Located immediately in rear of the screw conveyors and extending transversely of the frame is a cutter 95 which consists of a thin metal or ribbon type cutting tool manufactured with either a smooth knife edge, a saw-tooth edge or other kind of cutting edge so as to readily and quickly cut through the cane in or close to the ground, the cutting edge being reciprocated with a speed sufficiently high to prevent damage to the roots of the cane and the stalk itself as it is cut.

The cutting member is adjustably mounted so that it can be varied to cut the cane close to the ground regardless of the surface over which it is moving.

It will be observed that the saw is carried at its ends on vertical shafts 96 and 97 which are slidably mounted in bearings 98 and 99, and also by bearings at the lower end such as shown at 98' in Fig. 2.

The vertical shafts 96 and 97 are adjusted by means of levers 100 and 101 pivoted to cross members 102 and 103 as at 104 and 105 by means of the operating handles 106 and 107. The operating handles are provided with teeth 108 which are engageable under a tongue 109 carried by the frame so that by pulling on the handles the outer ends of the cutter may be raised to any desired extent, after which the teeth are engaged in the tongue 109 and the cutter held in such adjusted position.

Intermediate its ends the cutter is supported by an oscillating link 110 pivoted to a portion of the frame as at 111 and is provided with a plurality of openings 112. The pitman 113 which drives the oscillating link 110 may be disconnected from said link and inserted in any of the desired holes and the pivot point may be similarly changed so that the center of the cutter blade may likewise be raised to correspond to the adjustment of the ends, and in this manner the blade is maintained approximately parallel with the ground when adjusted to any of the desired heights above the ground.

It is to be noted that the operating levers for adjusting the cutter and the operating levers for operating the clutches 45 and 46 are all within easy reach of the operator who is located immediately in back of the transmission mechanism 18 during the operation of the machine, so that the entire operation may be easily accomplished by a single person without the necessity of shifting his position with reference to the machine in order that it may perform its various functions.

The machine as described thus far provides means for positioning the cane so that it can be engaged by the screw conveyors. It also discloses means consisting of the screw conveyors for straightening the cane into a vertical position and then bending it rearwardly and it also shows the means for cutting the cane while in its bent condition. However, after the cane has been cut it is necessary that it should be further handled by the machine so that it can be laid in windrows as it emerges from the rear end of the machine. This is accomplished by the following mechanism.

Secured to the extreme rear ends of shafts 90 and 94 are pinions 114 and 115, the pinion 114 showing more clearly in Fig. 2. These pinions mesh with pinions 116 and 117 carried at the lower end of vertical shafts 118 and 119 which are journaled for rotation in appropriate bearings and supported by frame members not shown. The extreme upper ends of shafts 118 and 119 carry sprockets 120 and 121 which receive power transmitted through shafts 90 and 94 and drive the sprocket chains 122 and 123 which are trained over idler sprockets 124 and 125 journaled in bearings on the frame member.

The sprocket chains 122 and 123 are provided with flights 126. Cooperating with the flights 126 are elastic belts 127 and 128 which frictionally engage the flights so that between each pair of flights and the elastic belt a pocket is formed.

It will be noted that the elastic belts are trained over two idler pulleys 129 and 130 and it will be noted that the pulleys of each pair are offset with relation to each other so that the space defined between the belting surrounding these pulleys and the sprocket chains 122 and 123 converges into a throat into which the cane is fed from the screw conveyors.

The flexible belts 127 and 128 are trained over idler pulleys 131 and 132, respectively, at the rear of the machine, and are so located with reference to the flights 126 that the engagement between the belt and the flights causes the belts to travel about the pulleys.

From the foregoing it will be seen that as the cane leaves the screw conveyors and is cut, the stalks are clamped intermediate their ends in the pockets defined by a pair of the flights and the belt. The movement of the sprocket chains 122 and 123 causes the cut cane to be moved rearwardly in a converging direction so that the stalks are moved toward the longitudinal center of the machine.

After being released from between the flights the cane then falls across the screw conveyor 133 which is located at the rear end of the machine and is provided with screws 134 and 135 of opposite pitch, and which are driven in such a direction that the butt end of the cane is moved toward the longitudinal center, the top of the stalk having already assumed that position after having been released by the flights. In this manner the cane is laid shingle fashion one upon another in the "middle" or furrow between the rows, but it is understood that due to the forward motion of the machine the cane will fall so that the foliage of one stalk will overlap only a portion, that is to say, the butt end of the stalk that has been previously cut and laid.

The screw 133 is journaled at opposite ends in bearings 136 and 137 carried on base frames 138 and 139 secured to the lower end of the end member 2 and the drive is imparted to the screw through a stub shaft 140 suitably carried by the frame and having thereon a sprocket 141 which is engaged by one of the runs of the chain 41 and the stub shaft 140 carries a sprocket 142 over which the chain 143 is trained and engages a sprocket 144 carried by the end of the screw 133.

While the drawings illustrate the drive for only one end of the screw, it is to be understood that the same structure may be employed in order to provide a drive for both ends of the screw.

The mechanism for driving the cutter member consists of a sheave secured to the lower end of the shaft 26 below the housing 25 and which is engaged by V-belts 145, said V-belts engaging a sheave carried at the upper end of the shaft 146 which is adjustably secured to frame members 147 and 148 by means of bearing brackets 149 and 150 which are secured to the supports 147 and 148 by means of slotted connections as shown at 151 and 152.

It will be understood that bolts pass through the slots and secure the bearings to the supports 147 and 148 so that by loosening the bolts and moving the shaft laterally the V-belt 145 may be tightened.

The shaft 146 is connected to a crank located within the housing 153 by means of suitable universal joints 154 and 155, the universal joints permitting the above-mentioned adjustment of the shaft 146.

The crank within the housing 153 is connected to the pitman 113 as previously described and imparts oscillating movement to the link 110 for the purpose of reciprocating the cutter.

The cutter 95 is attached to the adjusting rods 96 and 97 by means of rods 156 and 157 passing through the adjusting rods 96 and 97 and having springs 158 and 159 encircling the same and arranged within the housing 160 and 161. Tension of the cutter member 95 may be adjusted by means of suitable nuts secured to the outer ends of the rods 156 and 157 and coacting with the springs 158 and 159. The springs 158 and 159 also serve to assist in the return stroke of the cutter to its normal position.

The operation of the machine is as follows:

The power unit 19 is started and with the clutch in transmision 22 disengaged and with the clutches 45 and 46 disengaged, the transmission is shifted into low gear and the clutch in transmission engaged, which places all units of the machine in operation with the machine stationary.

Clutches 45 and 46 are now manipulated to guide the machine into the rows of cane as indicated at C, after which the gear 18 is shifted to the desired operating speed and the machine moves forward.

The guiding elements 55, 56 and 57 at the forward end of the machine crowd the cane slightly forward and at the same time bring it together and straighten the cane to vertical position so that it passes into the throats 58 and 59.

As the cane reaches the screws 60, 61, 62 and 63 it is immediately combed up straight and due to the fact that said screws operate at a speed faster than the forward motion of the machine and backward travel of the cane through the screws will be slightly faster than the forward travel of the machine and consequently the cane will be bent rearwardly as indicated at E in Fig. 2 just prior to engagement with the cutter. Rotation of the shaft 146 imparted thereto by the belt 145 driven from the shaft 26 causes rotation of the crank within the housing 153 and imparts reciprocating motion to the pitman 113 and through the link 110 to the cutter 95, and since the cutter 95 has been adjusted to cut the cane very close to the ground, it will be seen that the cutting takes place as the machine moves forward, leaving exposed only a small portion of the cane projecting above ground.

After the cane has been cut it passes over the saw and is clamped near the top by means of the flights 126 cooperating with the flexible belts 127 and 128. Said flights and belts are arranged in inclined relation with reference to the longitudinal axis of the machine as viewed in Fig. 1, from which it will be seen that the cane is carried to a position above the "middle" or furrow F. The flights 126 and belts 127 and 128 also move faster than the speed of forward motion of the machine.

The cane is released from the clamping effect of the flights and flexible belts 126, 127 and 128 after it reaches the end of the chains 122 and 123 from where it falls to a position diagonally across the screws 134 and 135 with the foliage lying in a position above the "middle" or furrow F and with the butt end of the stalks disposed adjacent the rows of cane C. The screws 134 and 135 immediately engage the butt ends of the stalks and due to the opposite pitch thereof the butt ends are moved into position over the "middle" or furrow F, after which they are released by the screws 134 and 135 due to the forward motion of the machine, and fall into the furrow F.

The succeeding cane passes through the machine in the same manner and reaches the "middle" G in the same position laterally as the preceding stalks except that it is fed along in the direction in which the machine is traveling, thus lapping the tops of the cane of one stalk over the lower portion of the preceding stalk.

When the machine reaches the ends of the rows one of the clutches 45 or 46 is disengaged, which arrests the motion of one of the driving wheels, leaving the other in motion, so that the machine is thus turned around due to the caster action of the front wheel 9, and the machine is then started into the next rows of cane which are to be operated upon.

It is to be noted that the force on spindles 10 of the rear wheels 7 and 8 resulting from the tension of chains 41 and 42 which serve to propel the machine, is such that it tends to throw these spindles into balance due to the reaction resulting from the weight of the machine supported by said spindle.

The degree with which the cane is bent backwardly from the action of the screws 60, 61, 62 and 63 may be changed by varying the speed of the screws which can be easily accomplished by changing the sizes of the sprockets driving the same.

While the present device has been described as employing sprocket and chain gearing, it is to be understood that any suitable gearing and shafting may be employed without departing from the spirit of this invention provided it functions in the manner herein described to produce the desired results.

It is found that occasionally chokes occur in the machine at which time it is necessary to reverse the same. This is easily accomplished by shifting the transmission 22 into reverse in the usual manner so that the machine may be driven rearwardly.

The present machine has been described as cutting two rows of cane simultaneously but of course it is understood that it may be employed for cutting a single row, in which event the cane would be operated upon in exactly the same manner as described, and will assume the position in the "middle" in the same manner as if cane were being fed from two rows and being moved toward the "middle" from opposite directions.

Having thus described our invention, what we claim as new and desire to secure by Letters Patent is:

1. A cane cutting machine comprising a frame, means for propelling said machine, guides on the forward end of the machine for positioning the cane, a plurality of intermeshing conveying screws engaging said cane, means for driving said screws at a speed greater than the forward speed of the machine whereby the cane to be cut is bent rearwardly, and a cutting member in rear of said screws for cutting the cane while in such bent position.

2. In a cane cutting and windrowing machine, a frame, a cutter thereon, means for presenting the cane to said cutter, a pair of driven clamping members to the rear of said cutter for clamping the cut cane and directing it toward the furrow between the cane rows, and means for depositing the cut cane in said furrow.

3. In a cane cutting and windrowing machine, a frame, a cutter thereon, means for presenting the cane to said cutter, clamping means for receiving the cut cane, said clamping means including a pair of endless driven members having parallel runs, flights on one of said members engaging the other endless member to form pockets between the flights to receive the cut cane, means for driving said clamping members, and means for depositing said cut cane in the furrow between the cane rows.

4. In a cane cutting and windrowing machine, a frame, a cutter thereon, means for presenting the cane to said cutter, clamping means for receiving the cut cane, said clamping means including a pair of endless driven members having parallel runs converging toward the medial line of the machine, flights on one of said members engaging the other endless member to form pockets between the flights to receive the cut cane, means for driving said clamping members whereby the cut cane is moved toward the furrow between the cane row, and means for depositing said cut cane in the furrow between the cane rows.

5. In a cane cutting and windrowing machine, a frame, a cutter thereon, means for presenting the cane to said cutter, clamping means for receiving the cut cane, said clamping means including a pair of endless driven members having parallel runs, one of said clamping members having flights thereon, the opposed clamping member comprising an elastic belt frictionally engaging said flights to form pockets to receive the cut cane, means for driving said clamping members, and means for depositing the cut cane in the furrow between the cane rows.

6. In a power driven cane cutting and windrowing machine, a frame, a cutter, means for presenting the cane to said cutting member, clamping means for receiving said cut cane, said clamping means comprising a pair of endless members having opposed parallel runs, one of said clamping members carrying flights thereon and the other comprising an elastic belt frictionally engaging the flights on the first clamping member, means for driving the flight carrying clamping member whereby the frictional engagement between the flights and elastic member imparts drive to said elastic member through said flights, and means for depositing the cut cane in the furrow between the cane rows.

7. In a cane cutting and windrowing machine, a frame, a cutter, means for presenting the cane to the cutter, means to the rear of said cutter to clamp the cut cane adjacent its top and move the cane toward the longitudinal center of the machine, a screw extending transversely of the frame to the rear of the clamping means and located below the same, and means for releasing the clamping means whereby the cane falls across said screw with the top of the cane falling into the furrow between the cane rows and the butt of the cane resting on the screw, and means for driving the screw to move said butt end of the cane into said furrow.

8. In a machine for cutting and windrowing a plurality of rows of cane simultaneously, a frame, guides on the forward end of the machine for positioning the cane, a plurality of pairs of intermeshing screw conveyors, one pair for each row of cane, behind said guides, means for driving said conveyors to position the cane for presentation to a cutter, a power driven cutter behind said pairs of screw conveyors, and clamping means for clamping the cut cane located behind each pair of conveyors, each clamping means including power driven endless members having parallel runs, the clamping members being disposed on opposite sides of the machine and converging toward the rear of the machine whereby cut cane is directed toward the furrow between the cane rows, a screw having oppositely pitched threads thereon extending transversely of the machine in back of the clamping member and means for driving the screw whereby cane released from the clamping means is deposited in the furrow between the cane rows.

9. In a cane cutting and windrowing machine, a frame, guides on the forward end of the machine to position the cane, a plurality of driven intermeshing converging screws behind said guides for positioning the cane for presentation to a cutter, a reciprocating cutter extending transversely of the machine at the rear of the converging screws, spring means for tensioning said cutter, means for adjusting said cutter to different heights, and means for driving said cutter.

10. In a cane cutting machine, a frame, guides on the forward end of the machine for positioning the cane to be received by screw conveyors, intermeshing screw conveyors in the rear of said guides and receiving the cane from the guides as the machine is propelled, for straightening the cane for presentation to a cutter, said conveyors comprising a helical rod, a hub and spokes connecting the rod and hub, a roller on the leading spoke of said conveyors to facilitate entrance of the cane thereto, and a power driven cutter at the rear of said conveyors for cutting the cane.

11. A cane cutting machine comprising a frame, a cutter thereon, driven means in advance of the cutter for presenting the cane to said cutter, a screw to the rear of said cutter, means for grasping the cut cane intermediate its ends and conveying it from the cutter to the screw and for laying the cane diagonally across said screw with the tops thereof lying in the furrow between the cane rows, and means for driving the screw to deposit the butt of the cane into said furrow.

JOSEPH JONES MUNSON.
BYRON CLAUDE THOMSON.